(12) United States Patent
Nagao

(10) Patent No.: US 9,015,695 B2
(45) Date of Patent: Apr. 21, 2015

(54) INFORMATION PROCESSING APPARATUS AND INFORMATION PROCESSING METHOD

(71) Applicant: Masafumi Nagao, Kanagawa (JP)

(72) Inventor: Masafumi Nagao, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/132,675

(22) Filed: Dec. 18, 2013

(65) Prior Publication Data

US 2014/0189674 A1 Jul. 3, 2014

(30) Foreign Application Priority Data

Dec. 27, 2012 (JP) .................................. 2012-286292

(51) Int. Cl.
*G06F 9/44* (2006.01)
*G06F 9/445* (2006.01)

(52) U.S. Cl.
CPC ........................................ *G06F 8/65* (2013.01)

(58) Field of Classification Search
CPC .......................................................... G06F 8/65
USPC .................................................. 717/167–178
See application file for complete search history.

(56) References Cited

U.S. PATENT DOCUMENTS

| | | | |
|---|---|---|---|
| 2003/0110483 A1* | 6/2003 | Ono ................................ | 717/170 |
| 2005/0160418 A1* | 7/2005 | Jeong et al. .................... | 717/173 |
| 2009/0187900 A1* | 7/2009 | Nakamoto ...................... | 717/168 |
| 2009/0271779 A1* | 10/2009 | Clark .............................. | 717/171 |
| 2010/0275018 A1* | 10/2010 | Pedersen ........................ | 713/168 |
| 2013/0179871 A1 | 7/2013 | Nagao et al. | |

FOREIGN PATENT DOCUMENTS

| | | |
|---|---|---|
| JP | 2012-190199 | 10/2012 |
| JP | 2013-142914 | 7/2013 |

OTHER PUBLICATIONS

Previtali, S.C.; Gross, T.R., "Dynamic Updating of Software Systems Based on Aspects," Software Maintenance, 2006. ICSM '06. 22nd IEEE International Conference on, pp. 83-92, Sep. 24-27, 2006.*

(Continued)

*Primary Examiner* — Satish Rampuria
(74) *Attorney, Agent, or Firm* — Oblon, McClelland, Maier & Neustadt, L.L.P.

(57) ABSTRACT

Firmware of subsystems included in an information processing apparatus is divided according to functions so as to include data areas containing first version information. Second version information indicating a version of the entire firmware based on the first version information of the data areas. The information processing apparatus includes: an update reception unit in a first subsystem that receives a request for updating firmware and firmware updating data containing third version information; a determination unit in a second subsystem that compares the second version information with the third version information to determine which of the data areas needs to be updated; and a partial update execution unit that requests the first subsystem to transmit a data portion of the firmware updating data corresponding to the data area determined to need to be updated, and stores the data portion in a storage unit.

5 Claims, 11 Drawing Sheets

(56) References Cited

OTHER PUBLICATIONS

Hosek, P.; Cadar, C., "Safe software updates via multi-version execution," Software Engineering (ICSE), 2013 35th International Conference on, pp. 612-621, May 18-26, 2013.*

Janghoon Lyu; Youngjin Kim; Yongsub Kim; Inhwan Lee, "A procedure-based dynamic software update," Dependable Systems and Networks, 2001. DSN 2001. International Conference on, pp. 271-280, Jul. 1-4, 2001.*

* cited by examiner

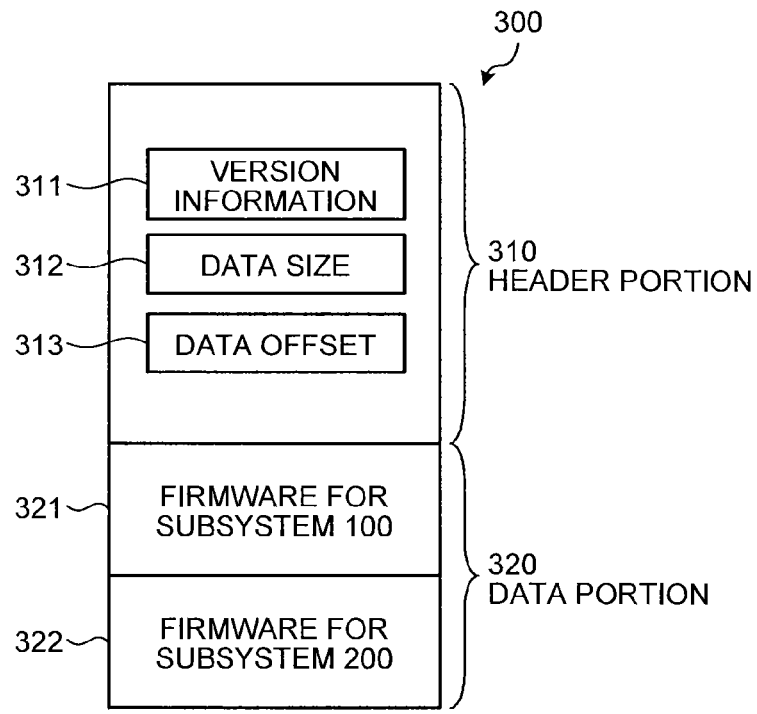
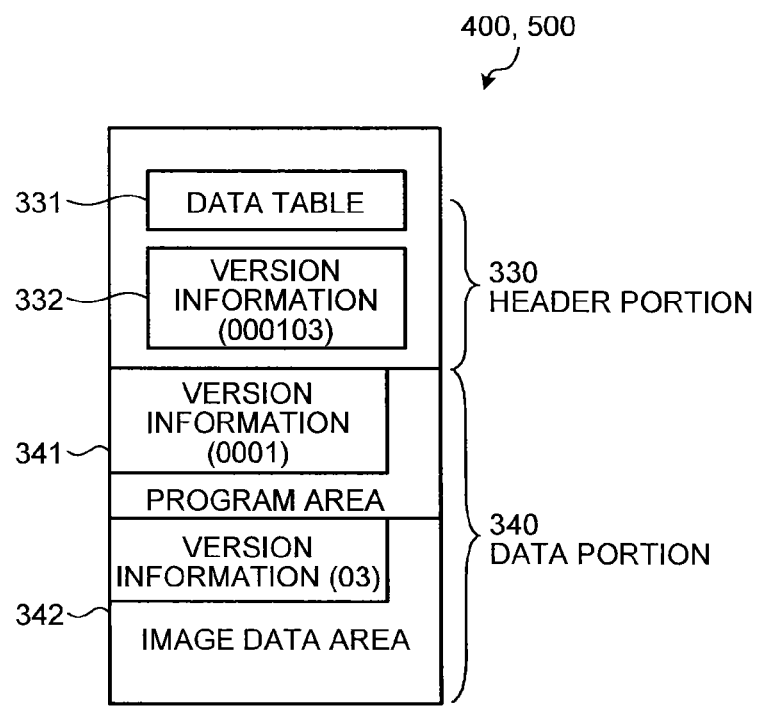

INFORMATION PROCESSING APPARATUS AND INFORMATION PROCESSING METHOD

CROSS-REFERENCE TO RELATED APPLICATIONS

The present application claims priority to and incorporates by reference the entire contents of Japanese Patent Application No. 2012-286292 filed in Japan on Dec. 27, 2012.

BACKGROUND OF THE INVENTION

1. Field of the Invention

The present invention relates to an information processing apparatus and an information processing method.

2. Description of the Related Art

There is known an information processing apparatus of a multiprocessor configuration with a plurality of processors each of which performs different processing. In this case, each processor is provided with firmware for operating the processor. Every time the firmware is modified, update operation is performed. In order to prevent a wrong combination of firmware and update the firmware efficiently, a plurality of pieces of firmware in an apparatus are updated altogether. To be more specific, a system including an interface for taking in updating data and including a processor acquires updating data for all processors and transmits corresponding updating data to other systems, whereby the update operation is performed.

Japanese Patent Application Laid-open No. 2012-190199 discloses a method of partial update for reducing firmware update time, in which one system extracts, when transmitting firmware updating data to another system, a difference between an old version and a new version and transmits only the extracted data for updating.

However, in order to transmit only the difference data as described above, a system acquiring updating data needs to grasp current firmware data of a system to which the updating data is transmitted. When a system transmitting updating data thus holds preliminarily firmware data of a system to which the updating data is transmitted, the capacity required for a storage area is increased. When firmware data of a system to which the updating data is transmitted is acquired at the time of updating, the acquisition takes time, which can limit the effect of time reduction.

In view of the above, there is a need to provide an information processing apparatus capable of updating firmware quickly.

SUMMARY OF THE INVENTION

It is an object of the present invention to at least partially solve the problems in the conventional technology.

An information processing apparatus includes a plurality of subsystems each of which includes a processor. Firmware of the subsystems is divided according to functions so as to include data areas containing first version information indicating respective versions. Second version information indicating a version of the entire firmware is uniquely determined based on the first version information of the data areas. The information processing apparatus includes: an update reception unit that is provided in a first subsystem and receives input of a request for updating the firmware and firmware updating data; a storage unit that is provided in each subsystem and stores therein the firmware; a determination unit that is provided in a second subsystem other than the first subsystem and compares the second version information of the firmware stored in the storage unit with third version information contained in the firmware updating data to determine which of the data areas needs to be updated based on whether the second version information and the third version information match each other regarding the functions; and a partial update execution unit that requests the first subsystem to transmit a data portion of the firmware updating data corresponding to the data area determined to need to be updated, acquires the data portion, and stores the data portion in the storage unit.

An information processing method is performed by an information processing apparatus including a plurality of subsystems each of which includes a processor and a storage unit that stores therein firmware. The firmware is divided according to functions so as to include data areas containing first version information indicating respective versions. Second version information indicating a version of the entire firmware is uniquely determined based on the first version information of the data areas. The information processing method includes: receiving, in a first subsystem, input of a request for updating the firmware and firmware updating data; comparing, in a second subsystem other than the first subsystem, the second version information of the firmware stored in the storage unit with third version information contained in the firmware updating data to determine which of the data areas needs to be updated based on whether the second version information and the third version information match each other regarding the functions; and executing partial update by requesting the first subsystem to transmit a data portion of the firmware updating data corresponding to the data area determined to need to be updated, acquiring the data portion, and storing the data portion in the storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating a data structure of firmware updating data in the first embodiment;

FIG. 4 is a diagram illustrating a data structure of data areas in the first embodiment;

DETAILED DESCRIPTION OF THE PREFERRED EMBODIMENTS

First Embodiment

Figure 1:
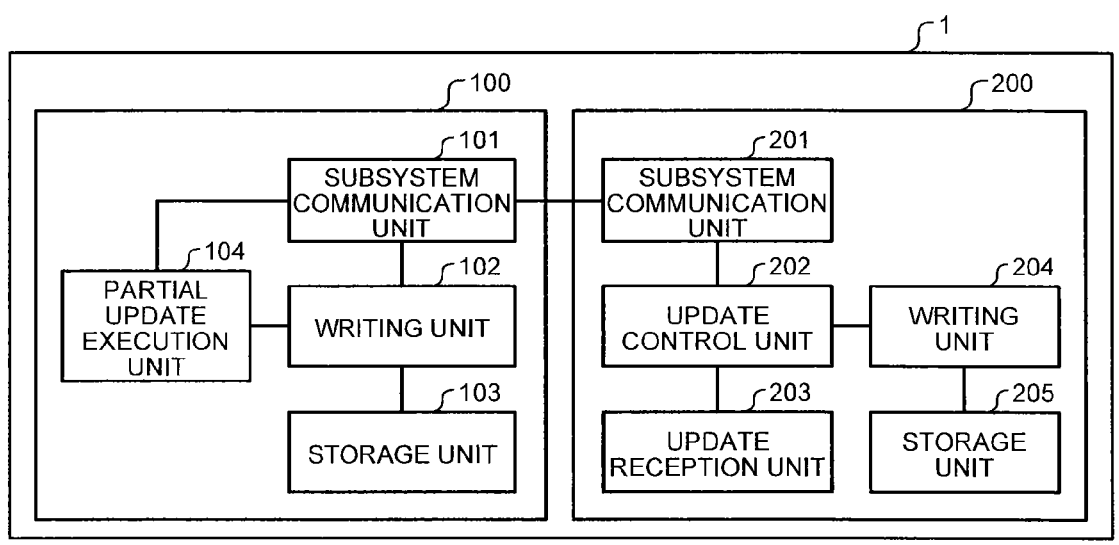
FIG. 1 is a block diagram illustrating a functional configuration of an information processing apparatus according to a first embodiment.

Embodiments of an information processing apparatus will be described in detail with reference to the enclosed drawings. FIG. 1 is a block diagram illustrating a functional configuration of an information processing apparatus 1 of the invention. The information processing apparatus 1 includes two subsystems 100 and 200. Each of the subsystems 100 and 200 includes a processor, and the apparatus is a multiprocessor apparatus.

The subsystem 100 includes a subsystem communication unit 101, a writing unit 102, a storage unit 103, and a partial update execution unit 104. The subsystem 200 includes a subsystem communication unit 201, an update control unit 202, an update reception unit 203, a writing unit 204, and a storage unit 205. The embodiment has a configuration in which the subsystem 200 receives firmware updating data and transmits the firmware updating data to the subsystem 100. The partial update execution unit 104 serves also as a determination unit.

The update reception unit 203 receives input of an update request and updating data including firmware data from the outside. The update control unit 202 manages control of update processing of the entire system such as transmission of firmware data to the subsystems 100 and 200. The storage units 103 and 205 store therein data such as firmware data. The stored data is not deleted even when the power is turned off. The writing units 102 and 204 delete old firmware data in the storage unit 103 and 205, respectively, and write new firmware updating data to the storage unit 103 and 205, respectively, for updating. The subsystem communication units 101 and 201 perform data communication between the subsystems 100 and 200. The partial update execution unit 104 performs partial update using only data equivalent to a difference between current firmware and new firmware of the subsystem 100. The details of the partial update will be described later. The number of the subsystems is not limited as long as it is two or more. In this case, a subsystem having acquired firmware updating data transmits the firmware updating data to other subsystems, and only one update control unit exists in the entire system.

Figure 2:
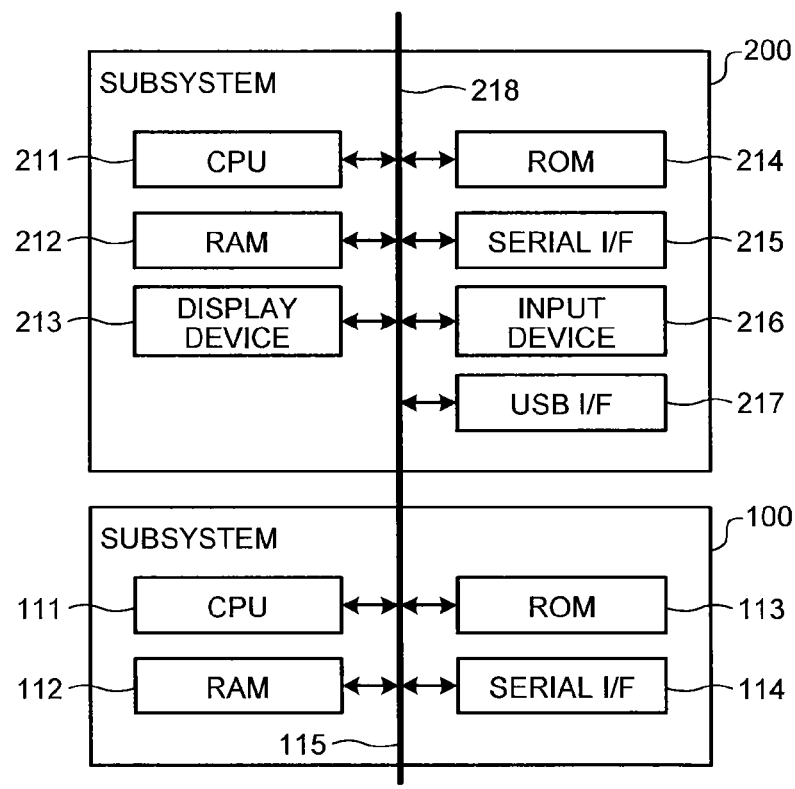
FIG. 2 is a block diagram illustrating a hardware configuration of the information processing apparatus in the first embodiment.

FIG. 2 is a diagram illustrating a hardware configuration of the information processing apparatus 1. The subsystem 100 has a configuration in which a central processing unit (CPU) 111, a random-access memory (RAM) 112, a read only memory (ROM) 113, a serial interface (I/F) 114 are connected to one another through a bus 115. The subsystem 200 has a configuration in which a CPU 211, a RAM 212, a display device 213, a ROM 214, a serial I/F 215, an input device 216, and a universal serial bus (USB) I/F 217 are connected to one another through a bus 218.

The CPUs 111 and 211 are provided in subsystems to control the inside of the subsystems 100 and 200, respectively. The ROMs 214 and 113 and the RAMs 212 and 112 are memories and hardware constituting the storage units 103 and 205 in which firmware data is stored. The USB I/F 217 achieves connection with external media. In the embodiment, firmware updating data is input to the update reception unit 203 of the information processing apparatus 1 through a USB memory. It is also possible to configure such that updating data is acquired from a network through a network I/F. The serial I/F 114 and 215 perform communication between the subsystems 100 and 200. The input device 216 is a device receiving operations from a user, and is exemplified by a keyboard. The display device 213 is a device performing various kinds of notification to a user.

FIG. 3 is a diagram illustrating an example of a data structure of firmware updating data 300 for firmware. As illustrated in FIG. 3, the firmware updating data 300 is mainly separated into two portions of a header portion 310 and a data portion 320. The header portion 310 includes, for each of the subsystems 100 and 200, version information 311 of the firmware (third version information), a data size 312, and a data offset 313 in the firmware updating data 300. The version information 311 contains version information regarding each data area included in the data portion 320. The data offset 313 is a value indicating an address range in the data portion 320, where the data for each of the subsystems 100 and 200 is stored. The data portion 320 includes firmware data 321 for the subsystem 100 and firmware data 322 for the subsystem 200 themselves.

FIG. 4 is a diagram illustrating an example of a structure of firmware data 400 and 500 of the subsystems 100 and 200. The firmware data 400 and 500 stored in the subsystems 100 and 200, respectively, is actually stored in this format in the storage units 103 and 205. The firmware data 400 and 500 is mainly separated into two portions of a header portion 330 and a data portion 340. The header potion 330 includes a data table 331 and version information 332 of the firmware. When data for update is divided and grouped according to functions, the address positions of data areas of respective groups are stored in the data table 331. In the embodiment, the data portion 340 is grouped into a program area 341 and an image data area 342. The program area 341 may be divided into a plurality of groups according to more detailed functions, for example.

Figure 5:
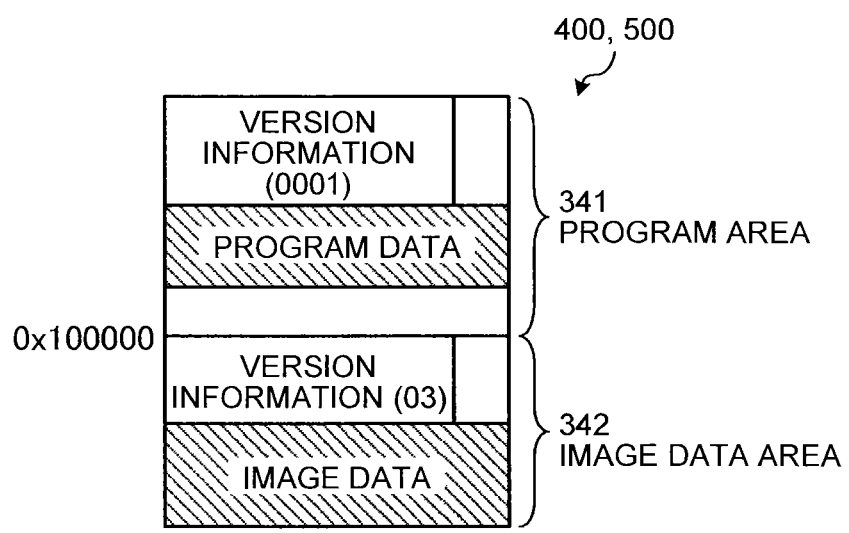
FIG. 5 is another diagram illustrating the data structure of the data areas in the first embodiment.

The data portion 340 includes firmware updating data itself for firmware, and is divided into areas according to the kinds. Each of the program area 341 and the image data area 342 has version information (first version information). The version information 332 of the entire firmware (second version information) is a concatenation of version information of data areas, and is uniquely determined by the first version information. That is, when the version information of the program area 341 is "0001" and the version information of the image data area 342 is "03", the version information 332 of the firmware is "000103". Thus, it is possible to recognize which data area is changed by comparing the version information 332 of the firmware with the version information 311 of the firmware updating data 300. As illustrated in FIG. 5, an offset position between data areas is set to be larger than an actual data size and always fixed. When the offset position between areas is fixed, partial update for each area is possible even the data size changes.

Figure 6:
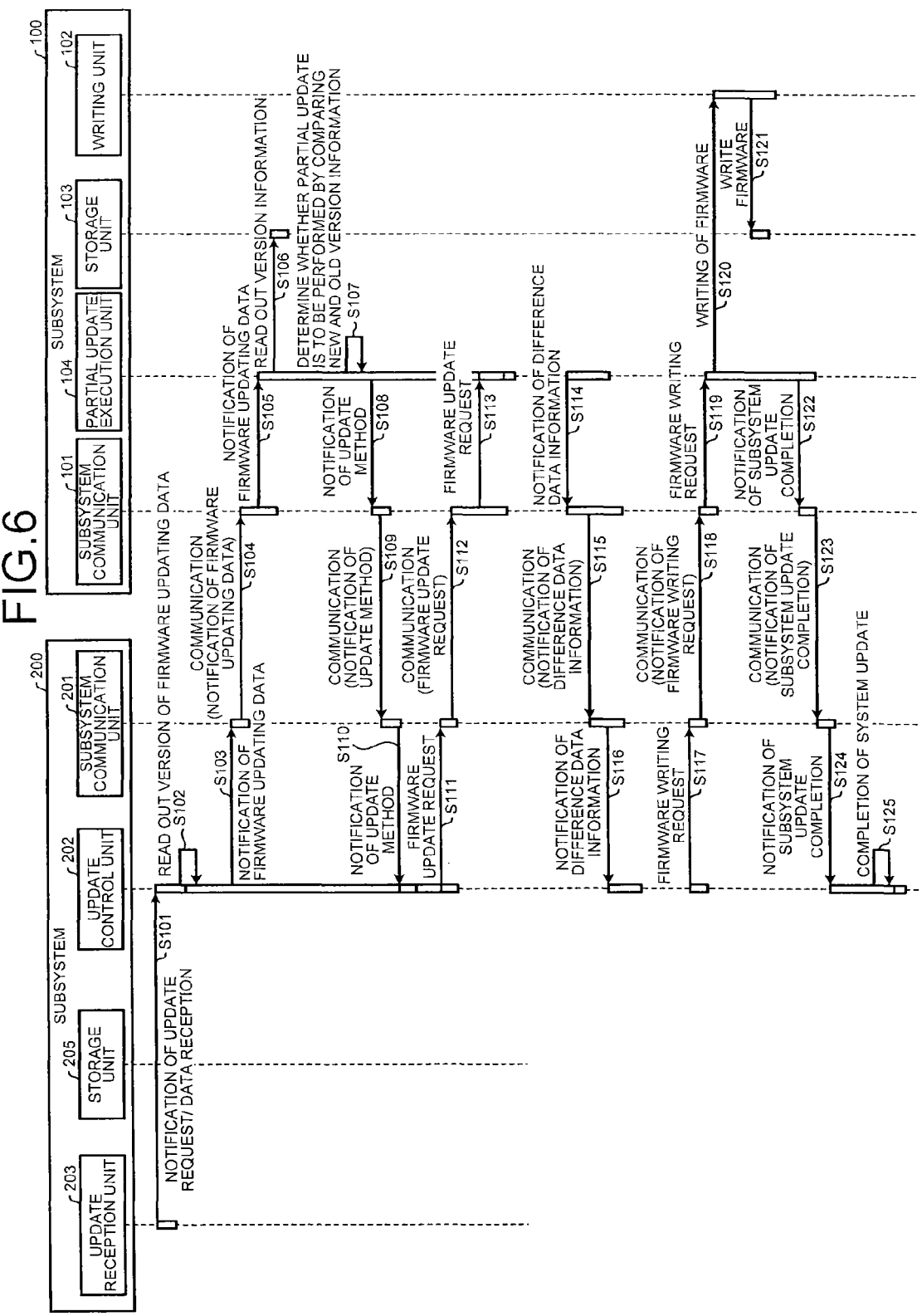
FIG. 6 is a sequence diagram illustrating a processing flow of updating firmware in the first embodiment.

Subsequently, the processing of updating firmware will be described with reference to FIG. 6. First, the update reception unit 203 receives input of an update request and the firmware updating data 300, and notifies the update control unit 202 that the update request has been made (Step S101). The update control unit 202 acquires the version information 311 of the subsystems (Step S102). Then, the update control unit 202 notifies the partial update execution unit 104 in the subsystem 100 of the version information 311 (Steps S103 to S105).

The partial update execution unit 104 reads out the version information 332 of the current firmware 400 from the storage unit 103 and compares the notified updating version information 311 with the current version information 332 to determine whether the partial update is to be performed (Steps S106 and S107). Then, the partial update execution unit 104 notifies the update control unit 202 of the determination result (Steps S108 to S110). The update control unit 202 requests the partial update execution unit 104 in the subsystem 100 to update the firmware (Steps S111 to S113).

When the partial update is to be performed, the partial update execution unit 104 notifies the update control unit 202 of information specifying difference data between the current firmware and the firmware updating data 300 (Steps S114 to S116). When the program area 341 is difference data, for example, the information specifying difference data is an offset position of the program area 341 included in the data table 331 or the like. The update control unit 202 transmits the firmware data 321 to the partial update execution unit 104 in the subsystem 100 based on the transmitted information specifying difference data and requests writing (Steps S117 to S119). The partial update execution unit 104 requests the writing unit 102 to write the firmware data 321, and the writing unit 102 writes the firmware data in the storage unit 103 (Steps S120 and S121). After the writing has been completed, the partial update execution unit 104 notifies the update control unit 202 that the writing has been completed (Steps S122 to S124). Then, after all of the necessary writing in the subsystem has been completed, the update control unit 202 completes the system update (Step S125).

Figure 7:
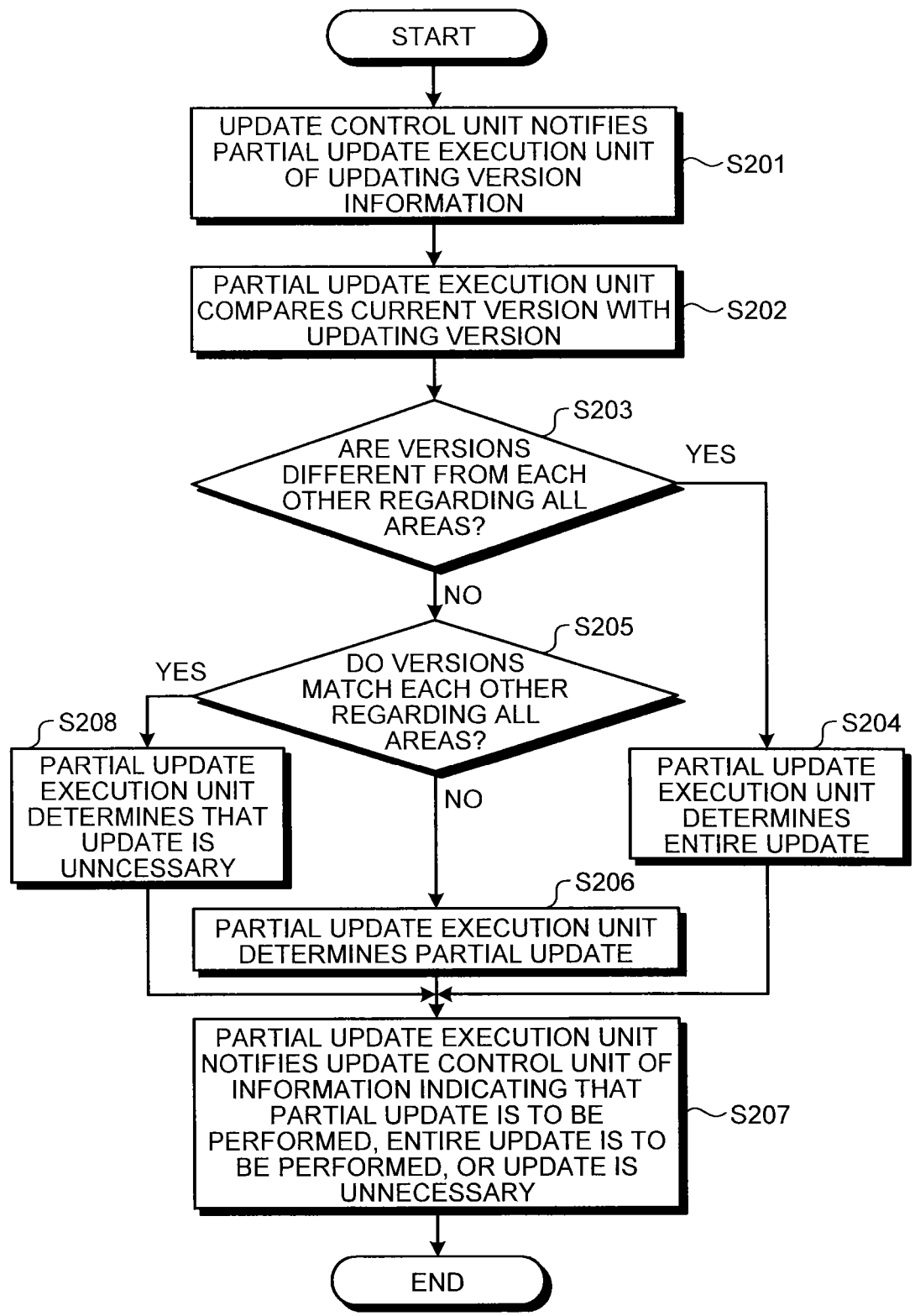
FIG. 7 is a flow diagram illustrating a processing flow of determining whether partial update is to be performed in the first embodiment.

Next, a processing flow of determining whether partial update is to be performed will be described in detail with reference to FIG. 7. As illustrated in FIG. 7, the update control unit 202 first notifies the partial update execution unit 104 of the version information 311 of the firmware for the subsystem 100 to be updated, which is contained in the firmware updating data 300 (Step S201). Then, the partial update execution unit 104 compares the notified version information 311 of the firmware updating data 300 with the version information 332 of the current firmware data 321 and 322 (Step S202). When the versions are different regarding all of the program area 341 and the image data area 342 (Yes at Step S203), as a result of comparison, the partial update execution unit 104 determines that it is necessary to update the firmware regarding all of the data areas, that is, in both the program area 341 and the image data area 342 (Step S204).

When the versions are not different regarding all areas of the program area 341 and the image data area 342 (No at Step S203), the partial update execution unit 104 determines whether the version matches the version information 311 of the firmware updating data 300 regarding all of the data areas (Step S205). When determining that the two pieces of the version information match each other regarding all of the data areas (Yes at Step S205), the partial update execution unit 104 determines that it is not necessary to update the firmware of the subsystem 100 (Step S208). When determining that the two pieces of the version information do not match each other regarding some data area (No at Step S205), the partial update execution unit 104 determines that it is necessary to update partially the data area regarding which the versions do not match each other (Step S206). Then, the partial update execution unit 104 notifies the update control unit 202 that the partial update is to be performed, the entire update is to be performed, or the update is not necessary based on the determination result at Steps S204, S206, or S208 (Step S207). When the versions do not match regarding all of the data areas, the partial update may be performed without determination performed at Step S205. In such a case, the notification of that the update is not necessary is not made.

Figure 8:
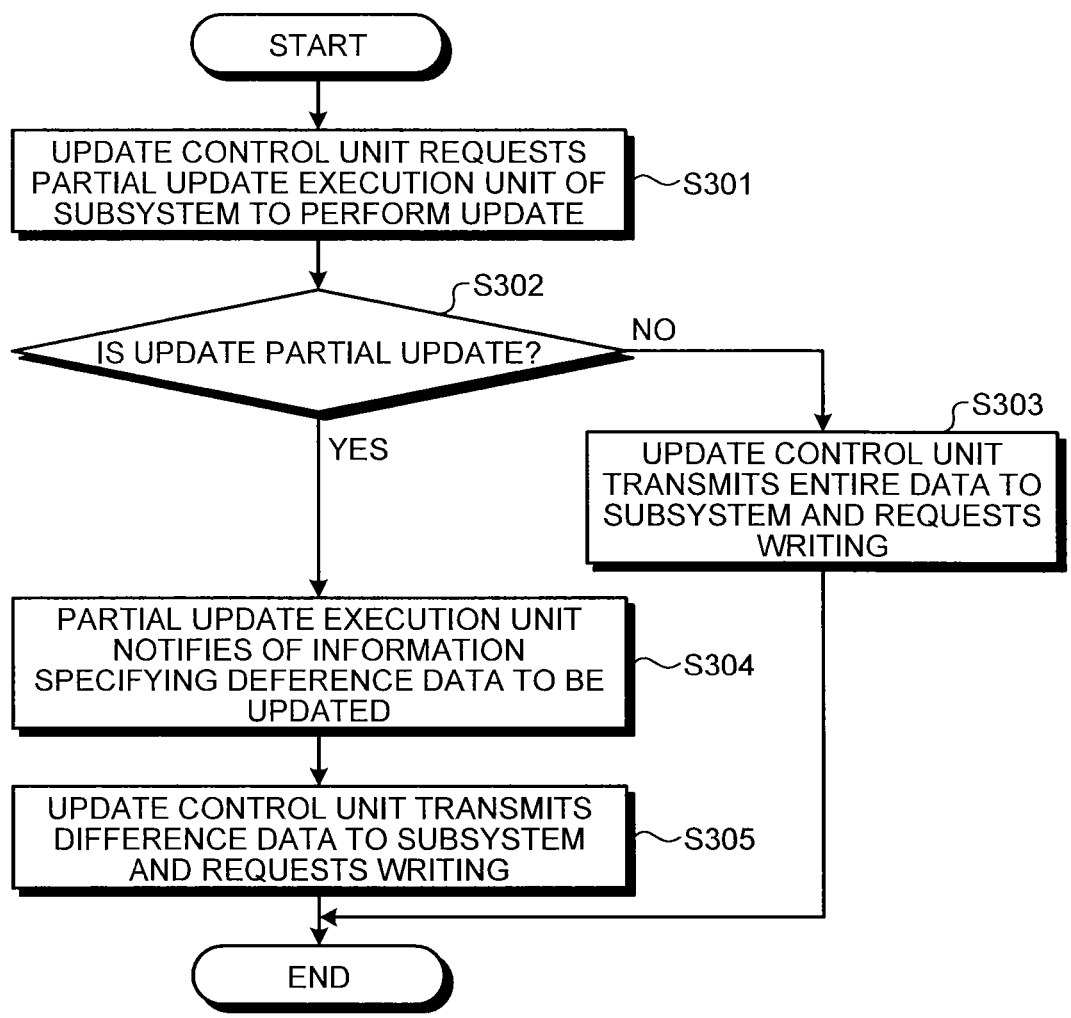
FIG. 8 is a flow diagram illustrating a processing flow of acquiring data when partial update is performed in the first embodiment.

Next, a processing flow of a case in which partial update is performed will be described with reference to FIG. 8. As illustrated in FIG. 8, the update control unit 202 first notifies the partial update execution unit 104 in the subsystem 100 of an update request (Step S301). The partial update execution unit 104 determines whether the update is partial update (Step S302).

When it is determined that the update is entire update (No at Step S302), the update control unit 202 transmits the entire firmware updating data for the subsystem 100 to the partial update execution unit 104, and the partial update execution unit 104 requests writing of the transmitted data (Step S303). When determining that the update is partial update (Yes at Step S302), the partial update execution unit 104 notifies the update control unit 202 of information specifying required difference data (Step S304). The update control unit 202 extracts, in accordance with the notified information specifying difference data, the corresponding data area from the firmware data 321 for the subsystem 100 in the firmware updating data 300 and transmits the data area to the partial update execution unit 104, so that the partial update execution unit 104 requests writing (Step S305). The information specifying necessary difference data is an offset position, for example. The partial update execution unit 104 notifies the update control unit 202 of an offset position such as "0x0000 to 0x10000" that are addresses where a certain data area is stored, as information specifying difference data. The update control unit 202 merely needs to extract data in accordance with the offset position, and thus does not need to grasp a detailed data structure of the firmware data 321 for the subsystem 100.

In the image processing apparatus of the above embodiment, the entire data of the firmware is not overwritten for updating but only the data having a difference is updated based on the comparison of versions between the firmware updating data and the current firmware data. Thus, the volume of data transmitted from the subsystem 200 having received firmware updating data to the subsystem 100 to be updated is reduced, which makes it possible to update the firmware quickly.

Moreover, in order to determine which data area in the firmware of the subsystem 100 to be updated is subjected to partial update, only version information in the firmware updating data 300 is transmitted so that difference data is specified by comparison of the version information, without transmitting the entire firmware updating data 300. Thus, there is no need to transmit the entire firmware data for comparison, which makes it possible to update the firmware quickly.

Moreover, the partial update execution unit 104 transmits, when specifying data to be subjected to partial update, the offset position to the update control unit 202. In the embodiment, addresses in which the data areas are stored are fixed between the firmware updating data 300 and the current firmware data 321. Thus, when the offset information is transmitted, it is possible to grasp which position of data area in the firmware updating data 300 is requested.

When the versions of the firmware match each other regarding all of the areas, the partial update execution unit 104 transmits notification of that the update is not necessary. Thus, the update control unit 202 does not transmit the firmware updating data 300 to the subsystem 100. Time required for data transmission is therefore shortened, which can reduce time of update operation.

Second Embodiment

Figure 9:
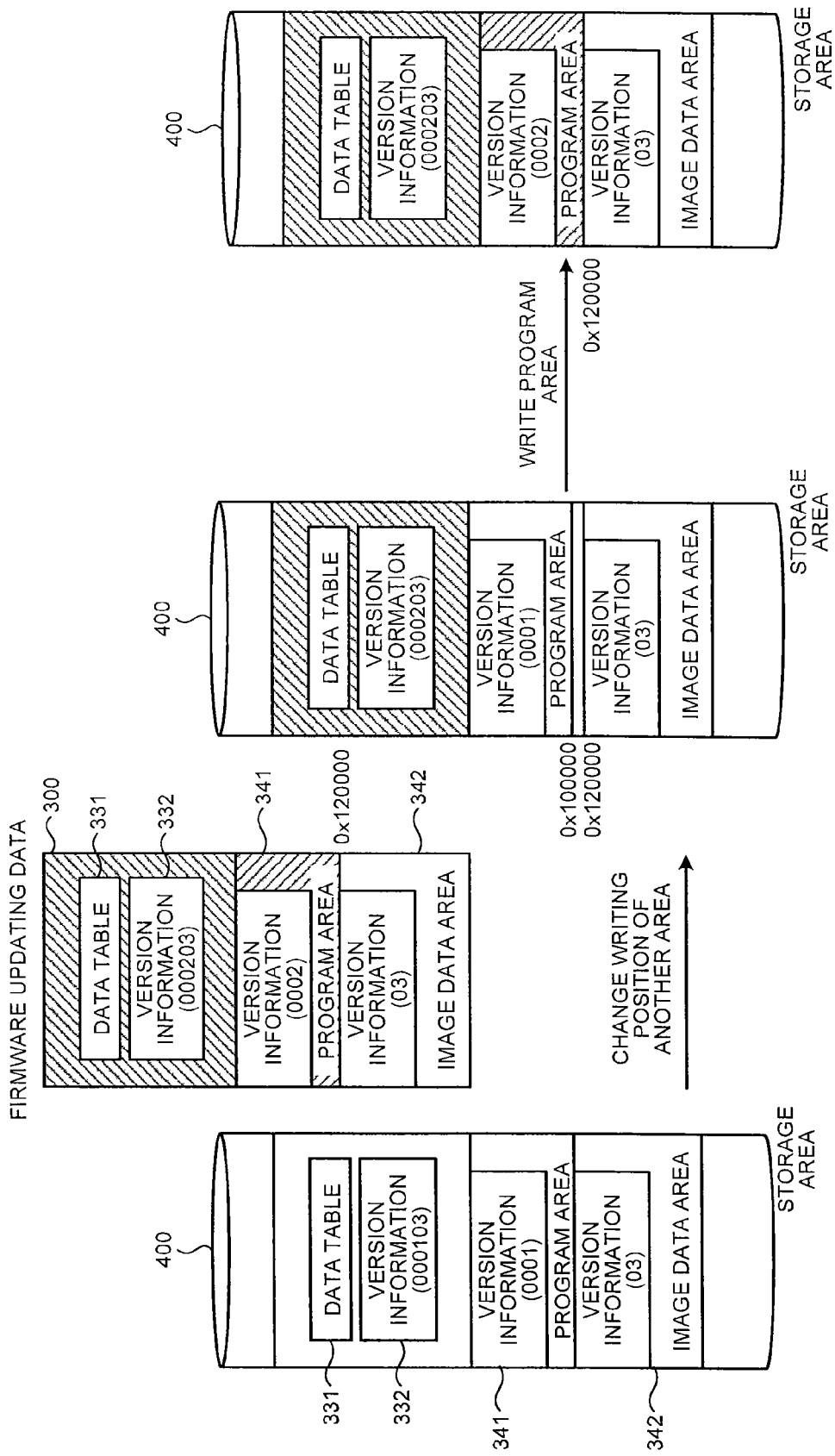
FIG. 9 is a diagram illustrating an example of a data structure of firmware according to a second embodiment.

The following will describe a second embodiment of the information processing apparatus of the invention. The second embodiment describes a case in which the offset position of the data area is different between the firmware updating data and the firmware data of each subsystem. FIG. 9 illustrates that the offset position of the program area 341 is different between the firmware data 321 of the subsystem 100 and the firmware updating data 300. In the firmware updating data 300, the offset position of the program area 341 is up to the address "0x120000". The offset information of the program area 341 of the firmware data 321 of the current subsystem 100 is up to the address "0x100000". In this case, even when the partial update execution unit 104 in the subsystem 100 notifies of "0x100000" as difference information, the firmware is not updated normally by the method of the first embodiment.

Figure 10:
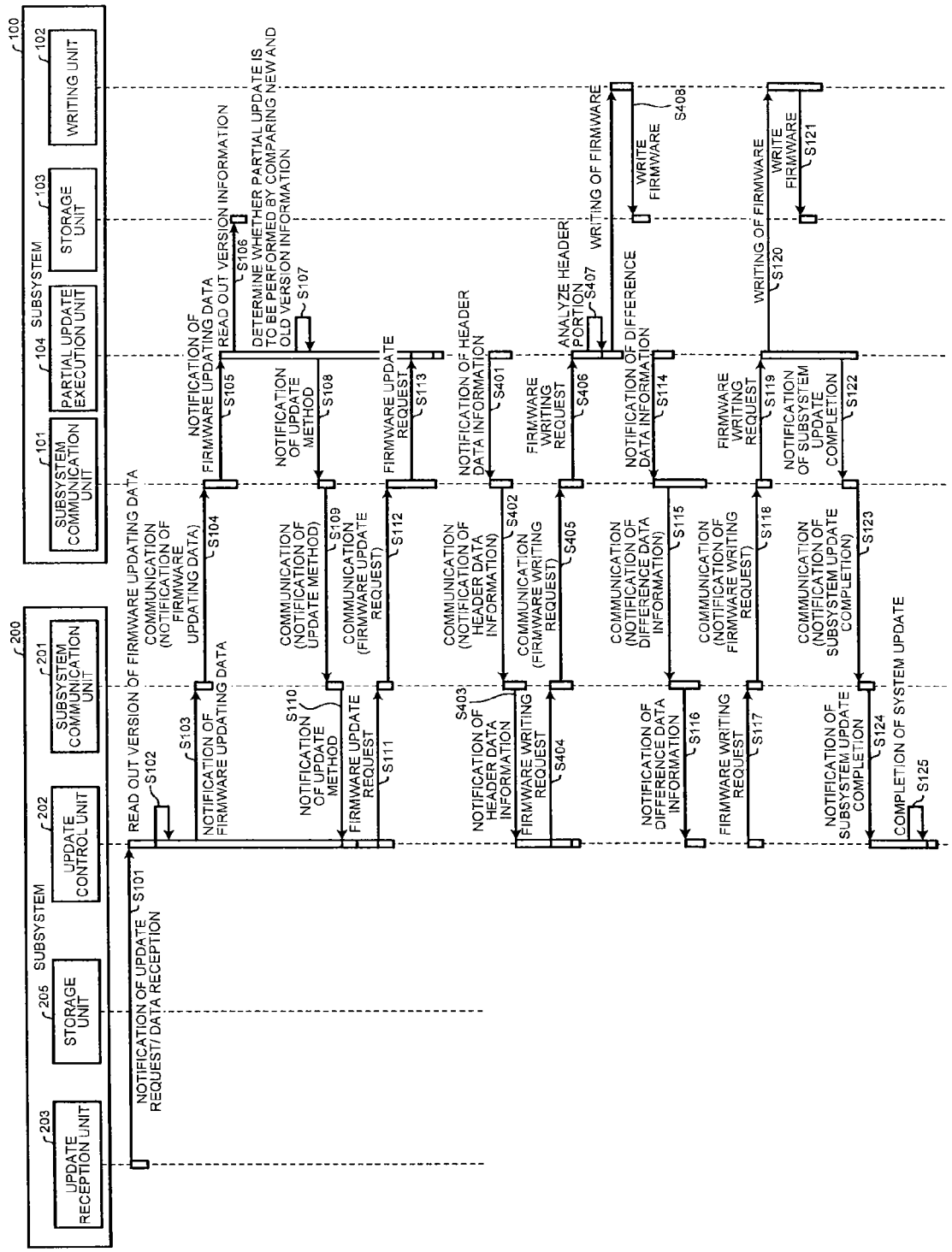
FIG. 10 is a sequence diagram illustrating a processing flow of updating firmware in the second embodiment.

The following will describe a processing flow of avoiding the above problem with reference to FIG. 10. In FIG. 10, the processing at Steps S401 to S408 is newly added in the sequence diagram illustrated in FIG. 6. The other processing is represented with the same symbols, and the explanation thereof is omitted.

As illustrated in FIG. 10, when the update of the firmware is requested, the partial update execution unit 104 notifies the update control unit 202 of information of the data table 331 in the header portion 330 (Steps S401 to S403). The update control unit 202 compares the transmitted data table 331 with the data table 331 of the firmware updating data 300 to grasp the positions of the data area. The update control unit 202 requests the partial update execution unit 104 to rewrite the data table 331 of the firmware data 321 of the subsystem 100 so as to correspond to the data table 331 in the firmware updating data 300 (Steps S404 to S406). The partial update execution unit 104 analyzes the information of the transmitted data table 331 and analyzes whether it is necessary to change the offset position of a data area other than the data area to be updated (Step S407). Then, the partial update execution unit 104 instructs the writing unit 102 to change the data table 331 or change the position of the data area, for example, based on the analysis result (Step S408).

Figure 11:
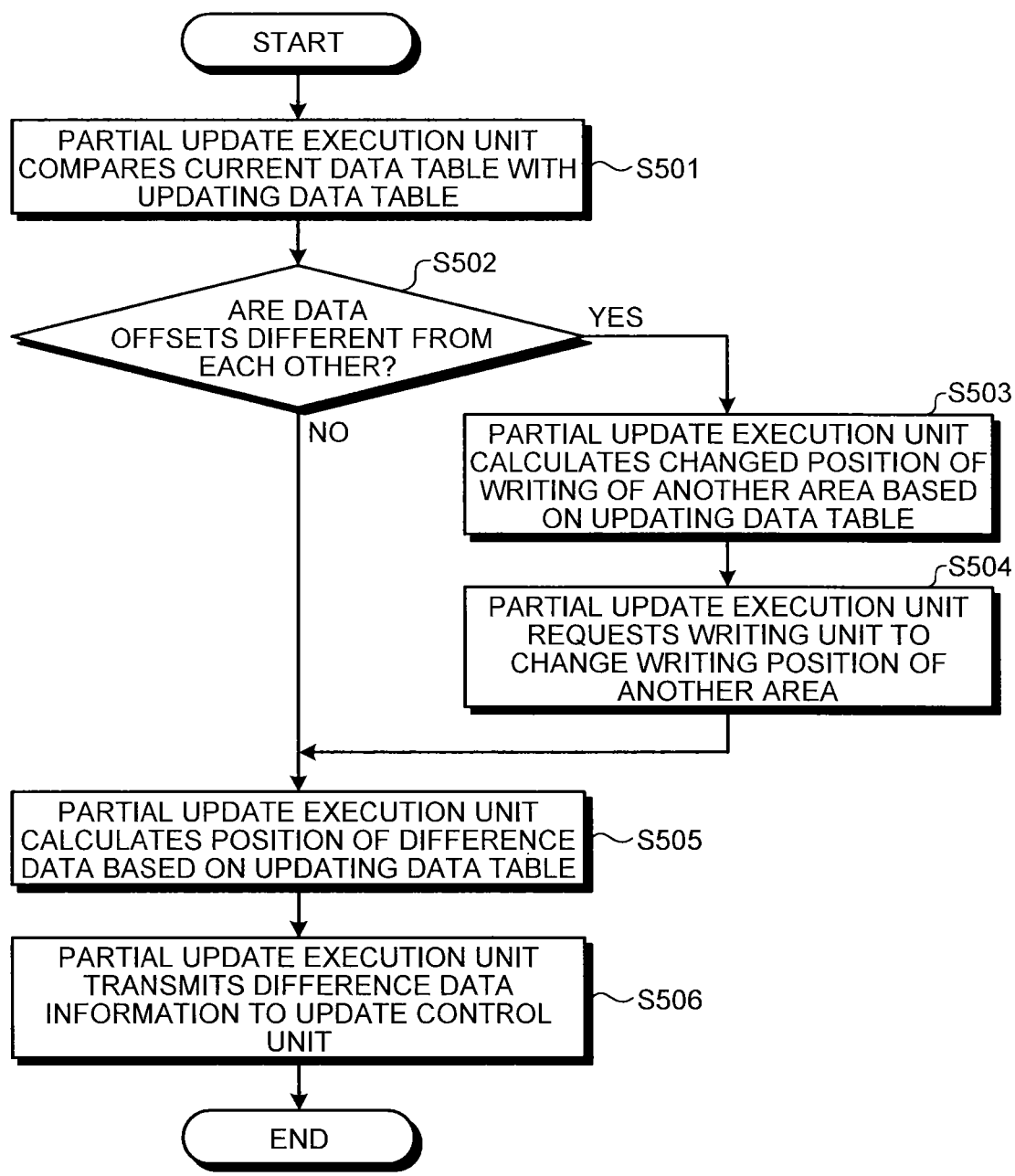
FIG. 11 is a flow diagram illustrating a processing flow of acquiring data when partial update is performed in the second embodiment.

The details of the above processing will be described with reference to FIG. 11. The processing of FIG. 11 represents the details of the processing at Steps S407 and S408 in FIG. 10. As illustrated in FIG. 11, the partial update execution unit 104 first compares the data table 331 of the current firmware with the data table 331 of the firmware updating data (Step S501). When determining, as a result of comparison, that the offset positions of data areas included in the data table are different between the current firmware and the firmware updating data (Yes at Step S502), the partial update execution unit 104 calculates a changed position of the writing of a data area other than the data area to be updated based on the data table 331 of the firmware data 321 to be updated that is stored in the storage unit 103 (Step S503). Then, the partial update execution unit 104 requests the writing unit 102 to write the other data area in the storage unit 103 based on the calculated changed position (Step S504). This processing is processing of changing, when the offset position of the program area 341 is shifted toward the image data area 342 as compared with the state before update, the position of the image data area 342 by the difference.

When determining, as a result of comparison, that the offset positions of data areas included in the data table are not different between the current firmware and the firmware updating data (No at Step S502), or when the change of the data area has been completed, the partial update execution unit 104 acquires the offset position of difference data based on the data table 331 stored in the storage unit 103 in the subsystem 100 to be updated (Step S505). Then, the partial update execution unit 104 notifies the update control unit 202 of the offset position information of the difference data (Step S506).

In the above processing, when the data is updated, the data of the program area 341 is written in the storage unit 103 after the offset position of the image data area 342 has been changed from "0x10000" to "0x12000", as illustrated in FIG. 9. Thus, the update operation can be performed even when the data length of the data areas is variable.

Modification

In the first embodiment described above, the offset position between the data areas is fixed, as illustrated in FIG. 5. Thus, significant data is not necessarily described in all of the data areas, and some portion of data is insignificant such as "0xFF". In such a case, when the update control unit 202 transmits the corresponding data of the firmware updating data 300 to the partial update execution unit 104 while including the insignificant data, the transmission time is increased by the insignificant data. Unnecessary transmission of the insignificant data therefore can be avoided by performing the processing illustrated in the following FIG. 12 when transmitting data. The update control unit 202 does not transmit all of the data altogether but transmits data for the data area to be updated while reading out each address.

Figure 12:
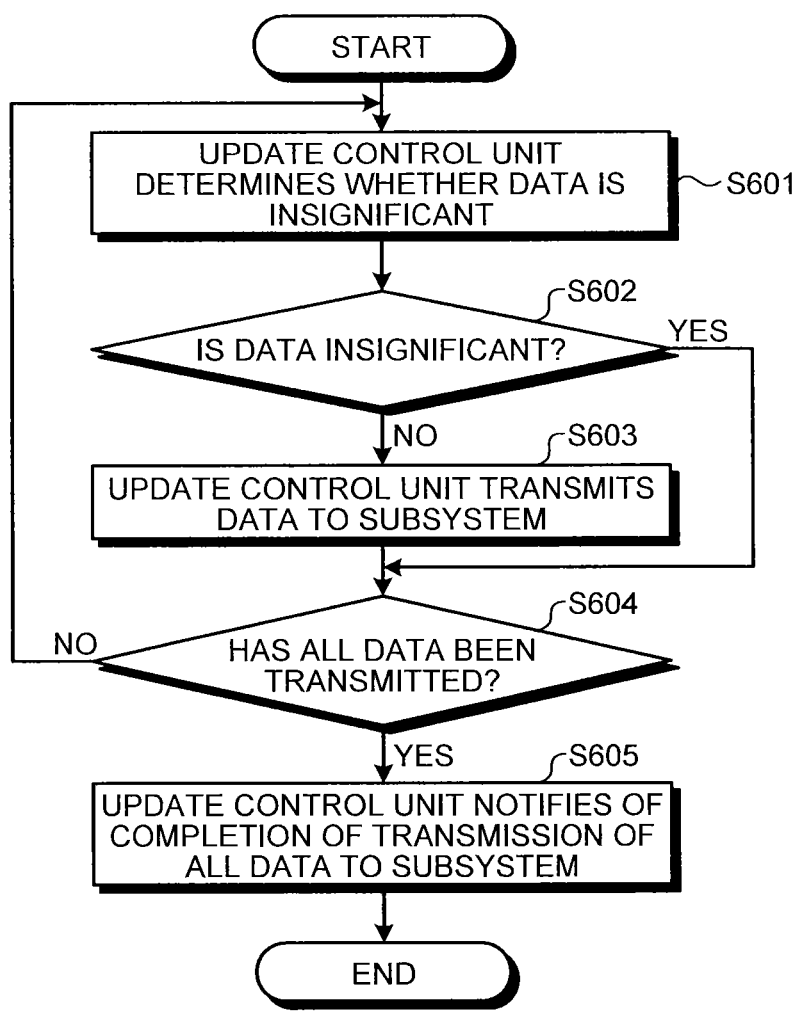
FIG. 12 is a flow diagram illustrating a processing flow of transmitting data according to a modification of the first embodiment.

As illustrated in FIG. 12, the update control unit 202 first determines whether the data in the read out address is insignificant data (Step S601). When determining that the data is insignificant (Yes at step S602), the update control unit 202 does not transmit the data and the processing shifts to Step S604. When determining that the data is not insignificant (No at Step S602), the update control unit 202 transmits the data to the partial update execution unit 104 in the subsystem 100 to be updated (Step S603). Then, whether the transmission of all data has been finished is determined (Step S604). When it is determined that the transmission of all data has not been finished (No at Step S604), the processing shifts to Step S601 and a next address is read out.

When it is determined that the transmission of all data has been finished (Yes at Step S604), the update control unit 202 notifies that all data has been transmitted to the subsystem 100 and finishes the processing (Step S605).

Figure 13:
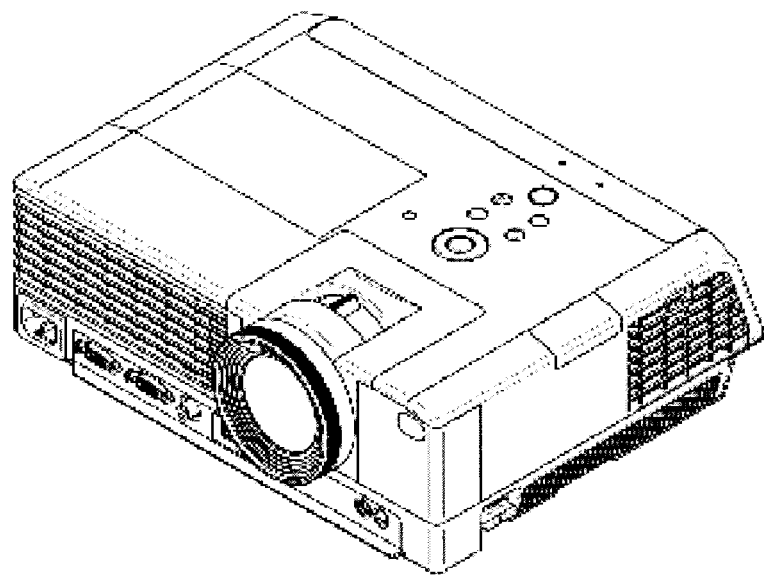
FIG. 13 is a perspective view of an image projection apparatus embodying the information processing apparatus of the embodiments, viewed from the front side.

The information processing apparatus of the embodiments can be achieved as an image projection apparatus, for example. FIG. 13 is a perspective view of an image projection apparatus, viewed from the front side.

Each of the computer programs executed in the information processing apparatus of the embodiments is recorded, as a file in an installable or executable format, in a computer readable recording medium such as a compact disk read only memory (CD-ROM), a flexible disk (FD), a compact disk recordable (CD-R), and a digital versatile disk (DVD), and then provided.

The computer programs executed in the information processing apparatus of the embodiments may be stored in a computer connected to a network such as the Internet, and then provided by download thereof through the network. Alternatively, the computer program executed in the information processing apparatus of the embodiments may be provided or distributed through a network such as the Internet.

The computer program executed in the information processing apparatus of the embodiments may be preliminarily embedded and provided in a ROM, for example.

The embodiment provides an information processing apparatus including a plurality of subsystems each of which includes a processor. Firmware of the subsystems is divided according to functions so as to include data areas containing first version information indicating respective versions. Second version information indicating a version of the entire firmware is uniquely determined based on the first version information of the data areas. The information processing apparatus includes: an update reception unit that is provided in a first subsystem and receives input of a request for updating the firmware and firmware updating data; a storage unit that is provided in each subsystem and stores therein the firmware; and a partial update execution unit that is provided in a second subsystem other than the first subsystem and compares the second version information of the firmware stored in the storage unit with third version information that is described in the same format as of the second information and contained in the firmware updating data to determine which area of the data areas needs to be updated based on a portion at which the second version information and the third version information do not match each other, requests the first subsystem to transmit a data portion of the firmware updating data corresponding to the data area determined to need to be updated, acquires the data portion, and stores the data portion in the storage unit.

The embodiment provides an effect that firmware can be quickly updated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus including a plurality of subsystems each of which includes a processor, firmware of the subsystems being divided according to functions so as to include data areas containing first version information indicating respective versions, and second version information indicating a version of the entire firmware being uniquely determined based on the first version information of the data areas, the information processing apparatus comprising:
an update reception unit that is provided in a first subsystem and receives input of a request for updating the firmware and firmware updating data;
a storage unit that is provided in each subsystem and stores therein the firmware;
a determination unit that is provided in a second subsystem other than the first subsystem and compares the second version information of the firmware stored in the storage unit with third version information contained in the firmware updating data to determine which of the data areas needs to be updated based on whether the second version information and the third version information match each other regarding the functions; and
a partial update execution unit that requests the first subsystem to transmit a data portion of the firmware updating data corresponding to a data area determined to need to be updated, acquires the data portion, and stores the data portion in the storage unit, wherein
the firmware of the subsystem and the firmware updating data share same offset positions of the data areas in respective data, and
the partial update execution unit notifies the first subsystem of an offset position of the data area determined to need to be updated.

2. The information processing apparatus according to claim 1, wherein the partial update execution unit notifies the first subsystem that transmission of the firmware updating data is not needed regarding a portion for which the second version information stored in the storage unit and the third version information match each other as a result of comparison.

3. The information processing apparatus according to claim 1, wherein the data portion of the firmware updating data corresponding to the data area determined to need to be updated does not include insignificant data, the data portion being acquired by the partial update execution unit from the first subsystem.

4. The information processing apparatus according to claim 1, wherein
the firmware of the subsystem and the firmware updating data contain data information indicating the offset positions of the data areas, and
the partial update execution unit acquires the data information of the firmware updating data, compares the data information of the firmware updating data with the data information of the firmware of the subsystem that includes the partial update execution unit so as to determine whether it is necessary to change an offset position of a data area other than the data area to be updated, and changes a writing position of the data area other than the data area to be updated in the storage unit upon determination that it is necessary to change the offset position of the data area other than the data area to be updated.

5. An information processing method performed by an information processing apparatus including a plurality of subsystems each of which includes a processor and a storage unit that stores therein firmware, the firmware being divided according to functions so as to include data areas containing first version information indicating respective versions, and second version information indicating a version of the entire firmware being uniquely determined based on the first version information of the data areas, the information processing method comprising:
receiving, in a first subsystem, input of a request for updating the firmware and firmware updating data;
comparing, in a second subsystem other than the first subsystem, the second version information of the firmware stored in the storage unit with third version information contained in the firmware updating data to determine which of the data areas needs to be updated based on whether the second version information and the third version information match each other regarding the functions;
executing partial update by requesting the first subsystem to transmit a data portion of the firmware updating data corresponding to a data area determined to need to be updated, acquiring the data portion, and storing the data portion in the storage unit, the firmware of the subsystem and the firmware updating data share same offset positions of the data areas in respective data; and
notifying the first subsystem of an offset position of the data area determined to need to be updated.

* * * * *